July 22, 1969 F. H. STITES ET AL 3,456,997

APPARATUS FOR ELIMINATING IMAGE DISTORTIONS

Filed July 20, 1967 3 Sheets-Sheet 1

INVENTORS.
FRANCIS H. STITES
and FRANKLIN L. FEIGIN

BY Peter Xiarhos

AGENT.

INVENTORS.
FRANCIS H. STITES
and FRANKLIN L. FEIGIN

BY Peter Xiarhos

AGENT.

INVENTORS.
FRANCIS H. STITES
and FRANKLIN L. FEIGIN

BY Peter Xiarhos

AGENT.

United States Patent Office 3,456,997

Patented July 22, 1969

3,456,997
APPARATUS FOR ELIMINATING IMAGE DISTORTIONS

Francis H. Stites and Franklin L. Feigin, Wayland, Mass., assignors to Sylvania Electric Products, Inc., a corporation of Delaware Filed July 20, 1967, Ser. No. 654,927
Int. Cl. G02b *17/08*
U.S. Cl. 350—7 4 Claims

ABSTRACT OF THE DISCLOSURE

Optical scanning apparatus for scanning multiple-stripe retroreflective coded labels such as used in vehicle identification systems. When a coded retroreflective label is affixed to a flatbed carrier vehicle or to a piggyback vehicle and scanned in a conventional fashion with light from a multifaceted rotatable scanning wheel facing the label at a predetermined small angle with respect to a plane normal to the surface of the label, many of the images of the label stripes obtained upon scanning the stripes are distorted. In accordance with the present invention, the distorted stripe images are eliminated by facing the scanning wheel toward the label in a direction normal to the surface of the label and by directing incident light onto the scanning wheel at the predetermined angle.

Background of the invention

The instant invention relates to scanning apparatus for scanning a retroreflective label affixed to an object. More particularly, the instant invention pertains to optical scanning apparatus for scanning a multiple-stripe retroreflective coded label with a beam of light wherein the light rays comprising the beam strike the coded label at small angles of incidence.

Various systems and apparatus are known for optically scanning coded labels affixed to vehicles or to other objects presented to a label-reading station. An exemplary system for scanning coded identification labels on railway vehicles, for example, railroad cars, is described in detail in United States Patent 3,225,177 to Stites et al., assigned to the assignee of the present application. In the above-mentioned patented system, a label is typically constructed from a plurality of rectangular retroreflective orange, blue, and white stripes, and non-reflecting black stripes, and affixed in a vertical orientation to the side of a railway vehicle to be identified at a predetermined label-reading location. The various stripes are arranged one above the other in a coded pattern representative of the identity of the vehicle or other information pertaining to the vehicle.

As the labelled vehicle passes the label-reading station, the coded information is sensed from the label by means of an optical scanning apparatus which scans the label from bottom to top with a beam comprising a plurality of incident rays of light. Preferably, the optical scanning apparatus is arranged such that the individual incident rays of light from the optical scanning apparatus strike the label at small angles of incidence. That is, each incident ray of light strikes the label from within a vertical plane forming a small angle relative to an associated plane normal to the surface of the label. Each light ray reflected from a retroreflective code stripe of the label subsequent to the impingement of a corresponding incident light ray is returned along the path of the incident light ray to optical translation apparatus and suitable associated apparatus for further processing. With the above-described light arrangement, the pickup of undesirable signals as a result of specular reflections from a protective coating of the label, or parts of, and materials located upon the vehicle, is minimized and a satisfactory signal-to-noise ratio is maintained.

The above-described patented system has functioned satisfactorily to sense data from coded retroreflective labels affixed to vehicles such as railroad cars and to process such sensed data. However, a problem may appear in certain applications, as in reading vehicle labels positioned at remote points quite high or quite low relative to the height of the optical scanning apparatus. For example, when a retroreflective label is affixed to a piggyback vehicle which is several feet above ground level, and such piggyback vehicle label is scanned with light rays at small angles of incidence, as described hereinabove, the reflected image of the piggyback vehicle label which is returned to the optical scanning apparatus is distorted. That is, rather than having a desirable rectangular configuration, the reflected image of the piggyback vehicle label is characterized by an undesirable trapezoidal configuration. Moreover, the distortion is greatest for the uppermost stripes of the piggyback vehicle label, that is, the points of the label most remote from the optical scanning apparatus.

In the same manner as described hereinabove, when a retroreflective label is affixed to a flatbed carrier vehicle label which is only a few feet above ground level, and such flatbed carrier vehicle label is scanned with light rays at small angles of incidence, the reflected image of the flatbed carrier vehicle label is similarly distorted. In this case, however, the distortion is greatest for the lowermost stripes of the flatbed carrier vehicle label, that is, the points of the label most remote from the optical scanning apparatus.

When the reflected image of each stripe of the flatbed carrier and piggyback vehicle labels is individually presented to and examined by a slotted mask included in the optical translation apparatus, as discussed in the aforementioned patent and also hereinafter, several of the stripe images are diagonally-oriented, that is, skewed relative to the slot in the mask, and only a portion of the retroreflected light received from each stripe passes through the slot in the mask to other parts of the optical translation apparatus. Because such portions passing through the mask are converted to electrical pulses the widths of which are difficult to measure, improper operation may result.

Summary of the invention

The present invention is directed to a scanning apparatus for eliminating the above-described image distortions.

Briefly, the scanning apparatus of the present invention comprises a means supporting a plurality of radiation-reflecting elements on the periphery of said means, and a source of electromagnetic radiation. Each of the plurality of radiation-reflecting elements is arranged to pass through a vertical plane parallel to the plane of a retroreflective label to be scanned and to reflect incident electromagnetic radiation therefrom at an angle of reflection equal to the angle of incidence of the electromagnetic radiation. In operation, the label is scanned by directing electromagnetic radiation onto each of the radiation-reflecting elements in succession along a path within a first plane forming an angle of $\theta$ degrees relative to a plane normal to the surface of each radiation-reflecting element and to the plane of the retroreflective label. In response to receiving the electromagnetic radiation at the angle of $\theta$ degrees, each of the radiation-reflecting elements reflects the electromagnetic radiation therefrom onto the retroreflective label along a path within a second plane forming an angle of $\theta$ degrees relative to the plane normal to the plane of each radiation-reflecting element and to the plane of the retroreflective label.

Description of prior art apparatus

Figures 1, 2, 3:
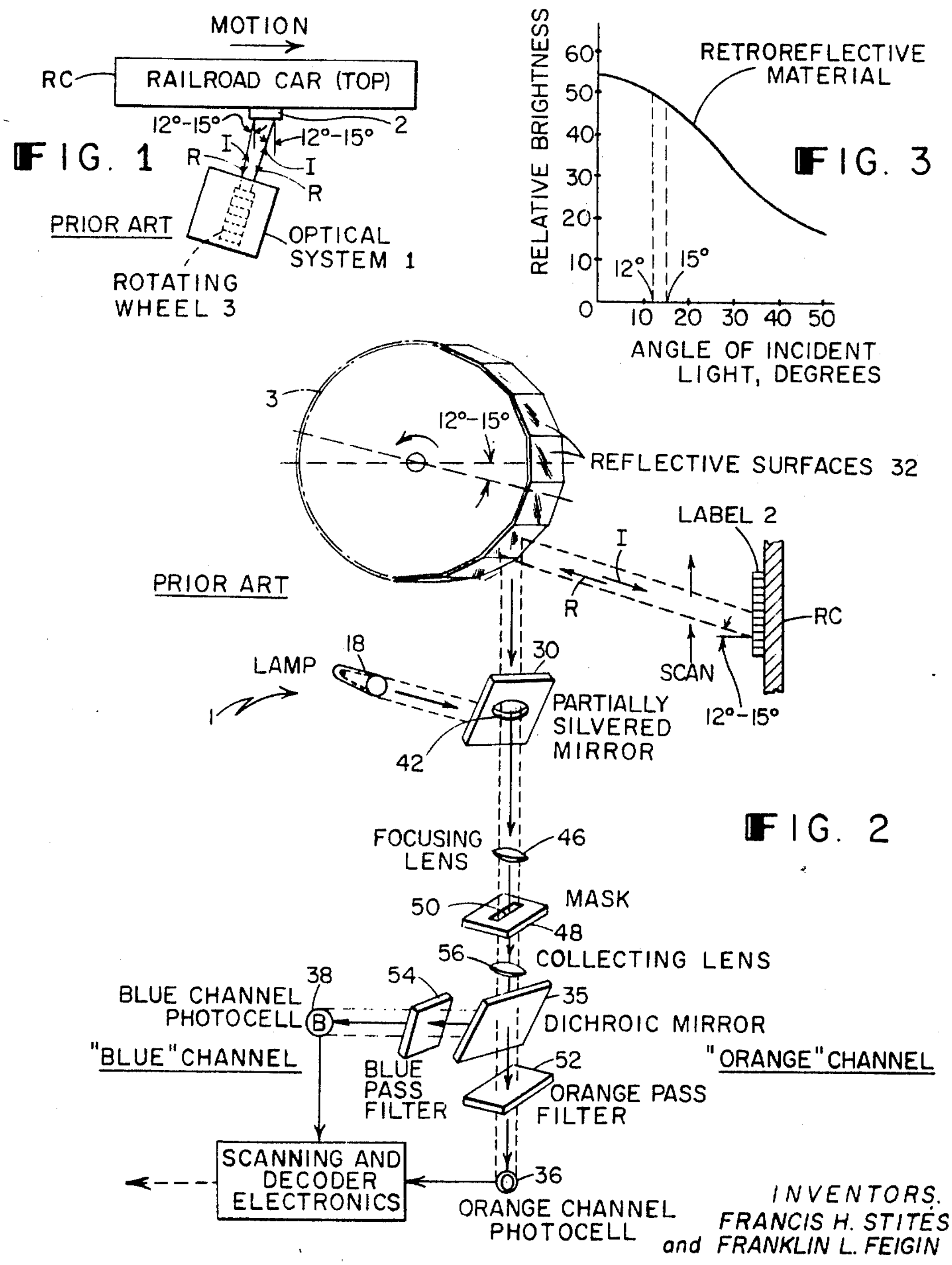
FIG. 1 illustrates a representation of the top view of a prior art arrangement of apparatus of the above-described patented system for scanning a coded label affixed to a moving railroad car with light within vertical planes, each plane forming a small angle relative to an associated vertical plane normal to the surface of the label.
FIG. 2 is a detailed perspective view of a portion of the apparatus of the arrangement shown in FIG. 1.
FIG. 3 is a curve of characteristics of a retroreflective material known by the trademark "Scotchlite" showing the relationship between the angle of incidence of light to the material and the relative brightness of the light retroreflected from the material.

Referring to FIG. 1, there is shown a top view of a prior art arrangement of apparatus, described in detail in United States Patent No. 3,225,177, to Stites et al., for reading coded retroreflective labels affixed to moving vehicles, for example, conventional railroad cars. As shown in FIG. 1, a scanning light beam is directed by a rotating wheel 3 comprising a part of an optical system 1 onto a coded retroreflective label 2 affixed to a railroad car RC. Typically, the retroreflective coded label 2 is affixed to a side of the railroad car RC at a height such that the label is scanned during the middle portion of the scanning beam provided by the optical system 1.

Each incident light ray I directed onto a retroreflective stripe of the label 2 lies within a vertical plane preferably forming a small angle with respect to an associated vertical plane normal to the surface of the label. Each reflected light ray R returned from a retroreflective stripe also lies in a plane forming a small angle with respect to a plane normal to the label. For specific details of the construction and arrangement of the elements comprising the coded retroreflective label 2, reference may be made to the afore-mentioned patent to Stites et al. The arrangement of the apparatus of FIG. 1 is shown in greater detail in the perspective view of FIG. 2.

As shown in FIG. 2, the optical system 1 comprises: the rotating wheel 3 having a plurality of reflective surfaces 32 on its periphery; a lamp 18; a partially-silvered mirror 30 provided with an elliptical aperture 42; a focussing lens 46; a mask 48 provided with a rectangular viewing slot 50; a collecting lens 56; a dichroic mirror 35; an orange pass filter 52; a blue pass filter 54; an orange channel photocell 36; and a blue channel photocell 38. Although reference may be made to the above-cited patent to Stites et al. for a detailed description of the operation of the optical system 1, for purposes of a fuller understanding of the present invention, a brief description of the operation will be presented.

As the railroad car RC bearing the coded retroreflective label 2 is presented to the optical system 1, an incident beam of light from the lamp 18 is reflected by the partially-silvered mirror 30 onto the reflective surfaces 32 of the rotating wheel 3. The light received by the reflective surfaces 32 is further reflected onto the label 2 upon a rotation motion being imparted to the rotating wheel 3 by a suitable motor (not shown). The incident light rays directed onto the label 2 appear in vertical planes forming small angles of approximately 12°–15° relative to associated vertical planes normal to the surface of the label 2.

The range of angles 12°–15° is preferred because of characteristics of the particular retroreflective material used, for example, "Scotchlite," which permits incident light directed thereon at an angle of 12°–15° to be reflected therefrom with a relatively high efficiency, noting FIG. 3. Experimentation has indicated that when smaller angles of incidence are employed, undesirable specular reflections are produced by protective coatings normally overlying and protecting "Scotchlite" labels from adverse environmental factors. When larger angles of incidence are employed, there is a significant decrease in the relative brightness of the light reflected by the retroreflective "Scotchlite" material, again noting FIG. 3. It should be understood that for other types of retroreflective materials, the range of angles with which a label may be read may differ from the 12°–15° range indicated above.

The light directed onto the label 2, as shown in FIGS. 1 and 2, is retroreflected by each of the retroreflective stripes of the label 2 along the path of the incident light. The retroreflected light is returned onto the reflective surfaces 32 of the rotating wheel 3, and then through the aperture 42 provided in the partially-silvered mirror 30. The elliptical aperture 42 presents a circular transmission path for the light reflected from the label 2 since the diagonal arrangement of the partially-silvered mirror 30 converts the ellipse to an effective circle with respect to the light path.

The retroreflected light which is received from the retroreflective stripes of the coded label 2 as the stripes are sucessively scanned with light from the reflective elements 32 constitutes the reflected image of the label 2. The reflected image of the label 2 is projected onto the mask 48 by the focusing lens 46. The dimensions of the viewing slot 50 are established so as to view at one time only a small portion of the entire width of each image of a stripe. Such portion is received by the collecting lens 56 and directed thereby onto the dichroic mirror 35.

As discussed in the above cited patent to Stites et al. and as shown in FIG. 2, when a four-color label is employed, two channels, an "orange" channel and a "blue" channel, are utilized. The dichroic mirror 35 divides the reflected light from the collecting lens 56 into orange and blue components by transmitting orange light through the orange pass filter 52 to the orange channel input photocell 36, and reflecting blue light through the blue pass filter 54 to the blue channel input photocell 38. The signals provided by the photocells 36 and 38 in response to receiving light from the orange pass filter 52 and the blue pass filter 54, respectively, are applied to scanning and decoder electronics circuits for further processing as described fully in the aforementioned patent to Stites et al.

Figures 4A, 4B:
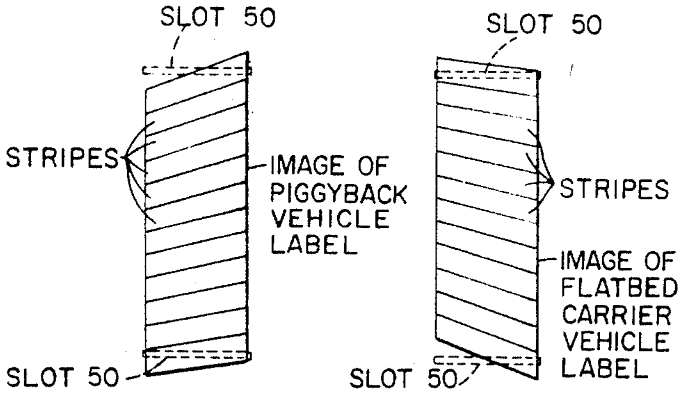
FIG. 4*a* is a pictorial representation of a trapezoidal reflected image of a coded retroreflective label affixed to a piggyback vehicle as viewed by a viewing slot in a mask included in the apparatus shown in FIG. 2.
FIG. 4*b* is a pictorial representation of a trapezoidal reflected image of a coded retroreflective label affixed to a flatbed carrier vehicle as viewed by the viewing slot in the mask included in the apparatus shown in FIG. 2.

Although the physical arrangement of the elements of FIGS. 1 and 2 has proven to be successful in reading coded retroreflective labels affixed to conventional railroad cars wherein each label is located substantially in the middle of the sweep of a scannng beam provided by the optical system 1, a problem exists when such arrangement is employed to read a coded retroreflective label positioned at the uppermost extremity of the sweep of the scanning beam, for example, a piggyback vehicle label, or at the lowermost extremity of the sweep of the scanning beam, for example, a flatbed carrier vehicle label. More specifically, when the optical system 1 is positioned as shown in FIGS. 1 and 2 and is used to scan a retroreflective piggyback vehicle label with light rays at angles of incidence of approximately 12°–15°, the image of the piggyback vehicle label projected onto the mask 48 to be selectively examined thereby has the general undesirable trapezoidal configuration shown in solid in FIG. 4*a*. Such trapezoidal configuration results from the fact that the piggyback vehicle label is scanned through an angle (12°–15°) and the reflective surfaces 32 lie in planes which are not parallel to the plane of the surface of the label. As may be noted from FIG. 4*a*, the distortion is greatest for the uppermost, that is, remotest, stripes of the piggyback vehicle label. FIG. 4*b* represents the reflected image of a flatbed carrier vehicle label obtained when the flatbed carrier vehicle label is scanned in the above-described manner with light rays at angles of incidence of 12°–15°. As may be noted from FIG. 4*b*, the distortion is greatest for the lowermost, that is, remotest stripes of the flatbed carrier vehicle label.

Figure 5A:
FIG. 5*a* is a representation of a typical electrical pulse applied to scanning and decoder circuitry included in the apparatus of FIG. 2 when an image of a stripe of a label under scan is not distorted in the manner depicted in FIGS. 4*a* and 4*b;*
Figure 5B:
FIG. 5*b* is a representation of a typical electrical pulse applied to the scanning decoder circuitry included in the apparatus of FIG. 2 when the image of a stripe of a label under scan is distorted in the manner depicted in FIGS. 4*a* and 4*b;*

As is further evident from FIGS. 4*a* and 4*b*, since many of the stripe images have an extreme diagonal orientation, the slot 50 in the mask 48 views only a portion of the widths if the images of such stripes. As a result of the slot 50 in the mask 48 viewing only a portion of the width of many of the stripe images, electrical signals havin the general configuration shown in FIG. 5*b*, rather than the desired configuration shown in FIG. 5*a*, are produced by the photocells 36 and 38 whenever the stripe image distortions evist. Because the widths of pulses having configurations such as shown in FIG. 5*b* are not easily measured, when such pulses are applied to the scanning and decoder electronics, improper operation thereof may result.

Description of present invention

Figures 6, 7:
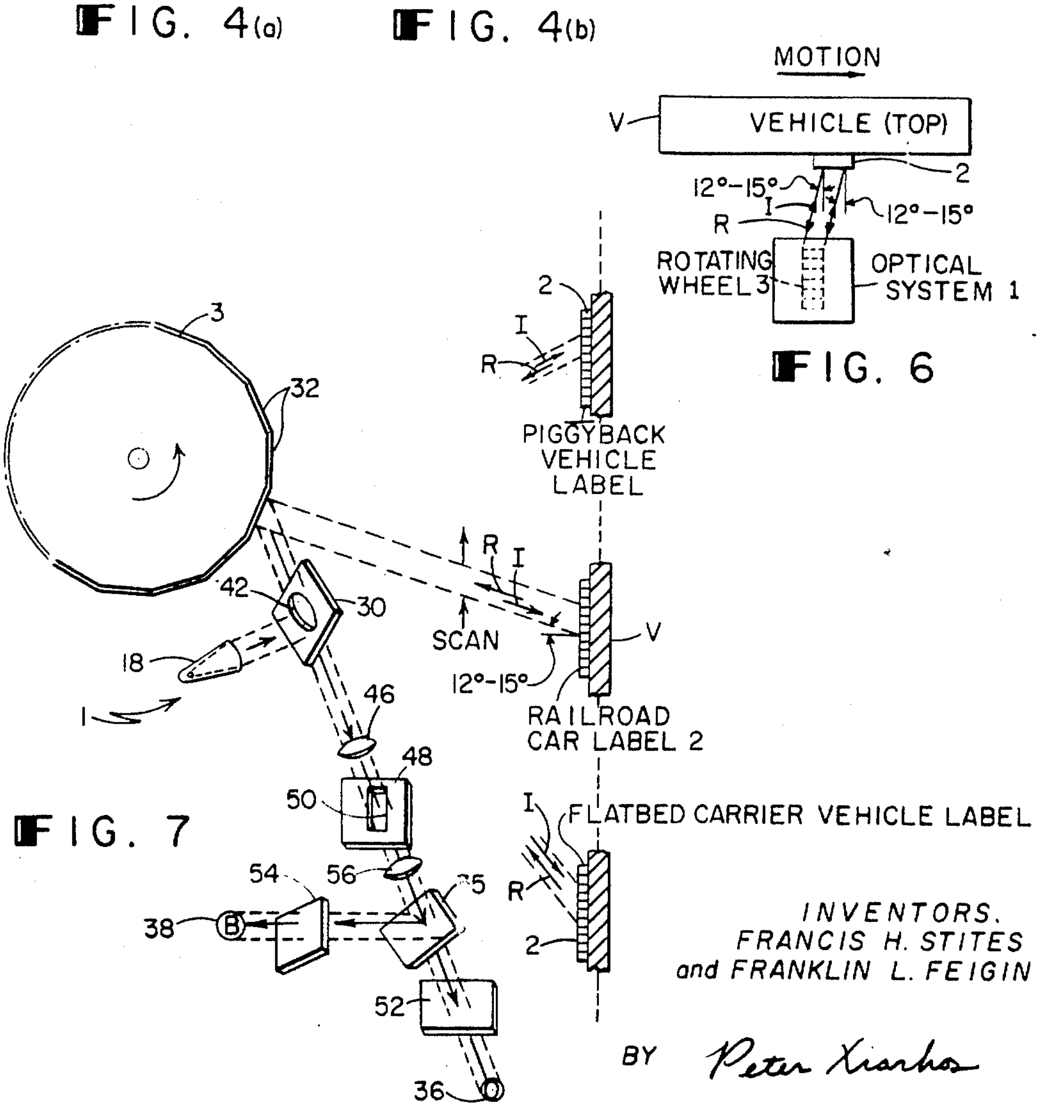
FIG. 6 is a top view of a general arrangement of apparatus of the present invention for scanning a coded retroreflective label affixed to a moving vehicle with light from within parallel vertical planes, each plane forming a small angle relative to an associated vertical plane normal to the surface of the label.
FIG. 7 is a detailed perspective view of the arrangement of the apparatus of the invention shown generally in FIG. 6.

The present invention, illustrated generally in the top view of FIG. 6 and in greater detail in FIG. 7, eliminates the stripe image distortions associated with the arrangement of FIGS. 1 and 2 by a particular arrangement of the reflective surfaces 32, the rotating wheel 3, and the source of system light whereby the incident light ray angles are maintained as before but the reflective surfaces 32 are made to move through a plane which is parallel to the plane of the label. Thus, as shown in FIG. 6 and unlike the arrangement of FIG. 2, the rotating wheel 3 faces a label 2 affixed to a vehicle V in a direction normal to the surface of the label 2. Additionally, light rays are directed onto the label 2 at an angle of 12°–15°, as before.

Figure 8A:
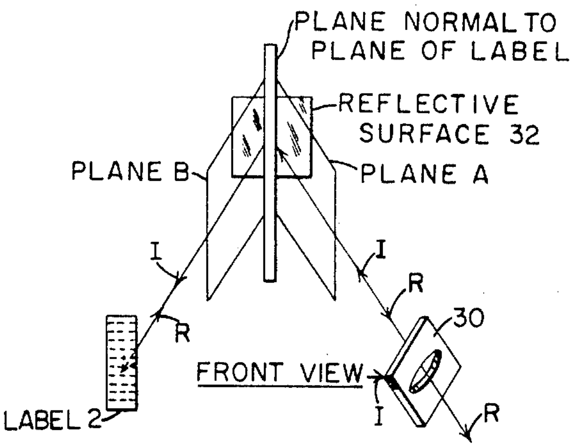
FIG. 8*a* is a diagrammatic representation illustrating the manner in which incident light is directed onto a coded retroreflective label from the apparatus of FIG. 7 as seen from the front of the apparatus.
Figure 8B:
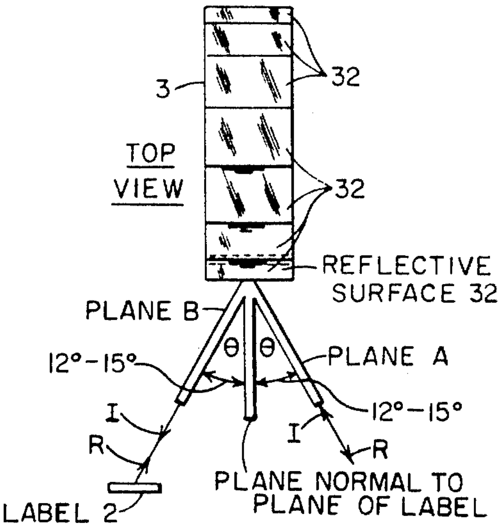
FIG. 8*b* is a diagrammatic representation similar to FIG. 8*a* as seen from the top of the apparatus.

As indicated in greater detail in FIG. 7, the lamp 18, the mirror 30, and the rotating wheel 3 are positioned relative to each other such that an incident light ray from the mirror 30 strikes each of the reflective surfaces 32 of the rotating wheel 3, as the wheel 3 rotates, from within a first vertical plane forming an angle of approximately 12°–15° with respect to a vertical plane normal to the direction of travel of the vehicle. In FIG. 8*a*, the plane of the incidence of a light ray is designated as plane A. As shown in FIGS. 8*a* and 8*b*, an incident light ray I within the plane A, upon striking a reflective surface 32, is reflected therefrom in a second vertical plane, plane B, onto the label 2. The vertical plane B also forms an angle of approximately 12°–15° with respect to the plane normal to the direction of travel of the vehicle V. In accordance with the particular arrangement of the mirror 30, the lamp 18, and the rotating wheel 3 in FIG. 7, the elements 46, 48, 50, 56, etc., are so positioned as to remain in the optical path of the retroreflected light passing through the opening 42 in the partially-silvered mirror 30.

Figures 9, 10:
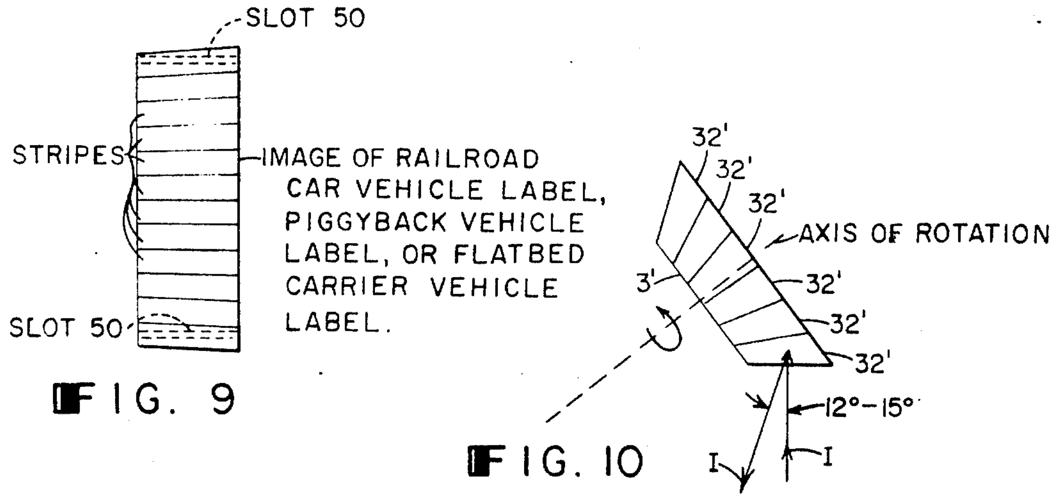
FIG. 9 is a pictorial representation of a reflected image of a coded retroreflective label on a railroad car, piggyback vehicle, or on a flatbed carrier vehicle, as viewed by a slot in a mask included in the apparatus of FIG. 7.
FIG. 10 illustrates a modification of the scanning wheel used in the present invention.

When the retroreflected light from the piggyback vehicle label, flatbed carrier vehicle label, or railroad car label is returned to the partially-silvered mirror 30 along the path of the incident light, and is received by the mask 48, each of the images which the slot 50 views assumes the general configuration shown in FIG. 9. The configuration of the image shown in FIG. 9 results from the fact that the reflective surfaces 32 pass through a plane parallel to the plane of the surface of the label under scan. Since the reflected image of the label passing through the slot 50 of the mask 48 of FIG. 7 is not skewed relative to the slot 50, pulses of the desired configuration shown in FIG. 5*a* are provided by the photocells 36 and 38 to the scanning and decoding electronics circuits for further processing.

FIG. 10 illustrates a structural modification of the rotating wheel 3 of the invention which may be utilized to provide the desired angle of incidence of light to a label to be scanned. As shown in FIG. 10, a rotating wheel 3' comprises a plurality of reflective surfaces 32', each having a trapezoidal configuration and positioned on the rotating wheel 3' so as to reflect each incident light ray, such as shown at I, by an amount equal to 12°–15° with respect to a plane normal to the plane of the label.

What is claimed is:

1. In a system for reading a retroreflective label affixed to an object, scanning apparatus comprising:

rotatable means supporting a plurality of radiation-reflecting elements on the periphery of said rotatable means, each radiation-reflecting element facing said label and passing through a vertical plane parallel to the plane of the label and adapted to reflect incident electromagnetic radiation therefrom at an angle of reflection equal to the angle of incidence of the electromagnetic radiation; and a source of electromagnetic radiation arranged to direct incident electromagnetic radiation onto each of said radiation-reflecting elements in succession along a path within a first plane forming an angle of $\theta$ degrees relative to a plane normal to the surface of each radiation-reflecting element and to the plane of the retro-reflective label, where $\theta$ has a value greater than zero, whereby the electromagnetic radiation is reflected from each of said radiation-reflecting elements onto said retroreflective label along a path within a second plane forming an angle of $\theta$ degrees relative to the plane normal to the plane of each radiation-reflecting element and to the plane of said retroreflective label.

2. Apparatus in accordance with claim 1 wherein $\theta$ has a value of 12°–15°.

3. In a system for reading a retroreflective label affixed to an object, scanning apparatus comprising:

rotatable means supporting a plurality of radiation-reflecting elements of a trapezoidal configuration on the periphery of said rotatable means, each radiation-reflecting element passing through a vertical plane parallel to the plane of the label and adapted to reflect incident electromagnetic radiation therefrom at an angle of reflection equal to the angle of incidence of the electromagnetic radiation; and a source of electromagnetic radiation arranged to direct incident electromagnetic radiation onto each of said radiation-reflecting elements along a path within a first plane normal to the plane of the retroreflective label, whereby the electromagnetic radiation is reflected from each of said radiation-reflecting elements onto said retroreflective label along a path within a second plane forming an angle of $\theta$ degrees relative to said first plane, where $\theta$ is greater than zero degrees.

4. In a system in accordance with claim 3 wherein $\theta$ has a value of 12°–15°.

References Cited

UNITED STATES PATENTS

| | | | |
|---|---|---|---|
| 2,059,221 | 11/1936 | Fessenden | 350—7 |
| 2,853,918 | 9/1958 | Yoler | 350—7 |
| 3,109,933 | 11/1963 | Baumann | 235—61.115 |
| 3,154,371 | 10/1964 | Johnson | 350—7 |
| 3,175,459 | 3/1965 | Smith et al. | 350—7 |
| 3,225,177 | 12/1965 | Stites et al. | 235—61.115 |
| 3,243,776 | 3/1966 | Abbott et al. | 235—61.115 |
| 3,308,275 | 3/1967 | Judin | 235—61.115 |

DAVID SCHONBERG, Primary Examiner

P. R. GILLIAM, Assistant Examiner

U.S. Cl. X.R.

235—61.11